United States Patent
Morrison

(10) Patent No.: US 7,841,715 B1
(45) Date of Patent: Nov. 30, 2010

(54) VARIABLE FOCUS LENS SYSTEM FOR EYEGLASSES

(76) Inventor: Glenn Arthur Morrison, 3141 N. 17120E Rd., Momence, IL (US) 60954

( * ) Notice: Subject to any disclaimer, the term of this patent is extended or adjusted under 35 U.S.C. 154(b) by 238 days.

(21) Appl. No.: 12/077,446

(22) Filed: Mar. 19, 2008

(51) Int. Cl.
*G02C 7/06* (2006.01)

(52) U.S. Cl. ................ 351/172; 351/159; 351/163; 351/165; 351/175; 359/741; 359/742; 359/813

(58) Field of Classification Search ............. 351/172
See application file for complete search history.

(56) References Cited

U.S. PATENT DOCUMENTS

| | | |
|---|---|---|
| 1,585,489 A | 5/1926 | Hailman |
| 2,001,952 A | 5/1935 | Birchall |
| 2,475,275 A | 7/1949 | Birchall |
| 2,642,776 A | 6/1953 | Boeder |
| 3,305,294 A | 2/1967 | Alvarez |
| 3,507,565 A | 4/1970 | Alvares et al. |
| 3,617,116 A * | 11/1971 | Jones .................. 351/177 |
| 4,070,105 A * | 1/1978 | Marzouk ............. 351/159 |
| 5,644,374 A | 7/1997 | Mukaiyama et al. |
| 5,982,543 A * | 11/1999 | Fiala .................. 359/565 |
| 5,999,147 A * | 12/1999 | Teitel ................... 345/8 |
| 6,288,846 B1 * | 9/2001 | Stoner, Jr. ............ 359/666 |
| 7,232,217 B2 * | 6/2007 | Spivey ................ 351/159 |
| 2007/0091257 A1 * | 4/2007 | Spivey ................ 351/159 |
| 2009/0018652 A1 * | 1/2009 | Hermans et al. ..... 623/6.38 |

* cited by examiner

*Primary Examiner*—Jessica T Stultz

(57) ABSTRACT

A variable focus lens system that can be used in eyeglasses is disclosed. The system consists of superimposed first and second transparent thin lenses with surfaces divided into Fresnel zones and zone boundaries. The lenses are relatively slidable for focus adjustment. The Fresnel zone boundary surfaces are made parallel to the user's optical line of sight to reduce visual obstructions, and the zone boundaries may be restricted to areas near the lens periphery to further reduce visual obstructions. An opaque light absorbing coating may be applied to the zone boundaries to reduce light scattering. A fixed prescription lens, having the user's distance and astigmatism corrections, may be superimposed on the other two lenses.

4 Claims, 4 Drawing Sheets

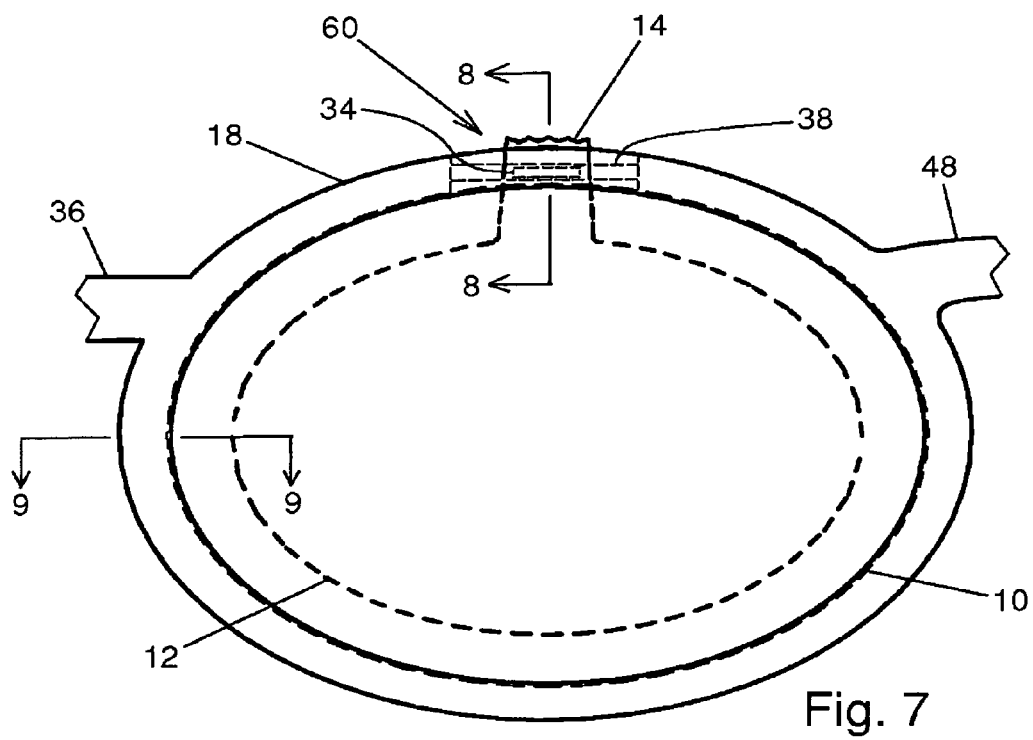
Fig. 7
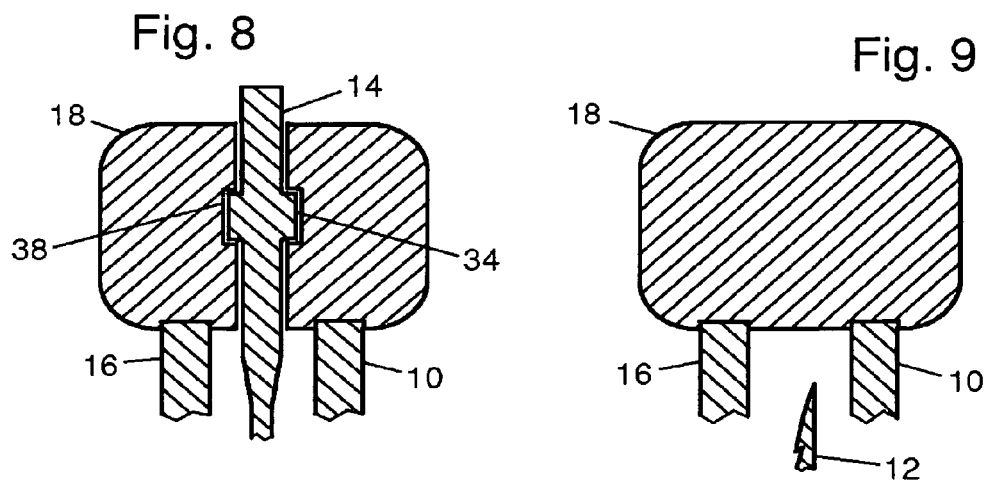
Fig. 8
Fig. 9

VARIABLE FOCUS LENS SYSTEM FOR EYEGLASSES

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF INVENTION

The present invention relates to variable focus lens systems and, more particularly, to variable focus eyeglasses.

BACKGROUND

As they age, many people require some form of correction for lack of visual accommodation or presbyopia. In view of this, there is tremendous demand for compact lightweight eyeglasses that can be easily adjusted for distant through reading focus. The basic problem is to design variable focus eyeglasses that are durable, reliable, with focus easily and rapidly adjustable, lightweight enough to be comfortable, aesthetically attractive, and reasonably priced. The eyeglasses must also be easily customized for the user's distance and astigmatism corrections.

Some of the existing types of multifocus lens for use in eyeglasses are: bifocals, trifocals and progressive lenses having either zones with differing dioptric powers, or continuously varying powers across the lens. With this type of lens, to get a full field of vision the wearer must tilt the head up and down or adjust the position of the glasses as they focus on objects at various distances. When reading, the view to either side of the reading zone is indistinct.

Another type of variable focus lens involves a fluid which is controlled to vary the shape of a flexible lens envelope. Typically this involves mechanically changing the shape of the lens by varying the amount of a transparent fluid contained between the two lens surfaces. Examples are: U.S. Pat. No. 6,618,208 (Silver), and U.S. Pat. No. 6,040,947 and U.S. Pat. No. 5,999,328 (Kurtin, et al). In this type of lens, the fluid may leak from the envelope designed to contain it. Many such lenses suffer from poor optical quality due to the mounting arrangement for the membrane or poor choice of the fluid.

In another concept, a voltage is controlled to vary the refractive index of the individual pixels of a liquid crystal lens, thus controlling the focal length of the lens as a whole. An example is U.S. Pat. No. 6,619,799 (Blum, et al). In the case of liquid crystal pixelated lenses, there are the problems of slow focus adjustment speed, and variation of refractive index with temperature. Another drawback is the projected high cost of this type of lens.

In the concept most relevant to the present invention, two relatively slidable aspherical lenses are positioned to produce variable power in the simulated equivalent of a spherical lens. Examples are U.S. Pat. Nos. 3,305,294 and 3,507,565 (Alvarez), and U.S. Pat. No. 5,644,374 (Mukaiyama, et al.)

With slidable lenses designed up to the present time, there is a bulkiness factor due to the increase in lens thickness towards the lens periphery. The edge of the slidable lens element, being thick in some places, would likely be an objectionable obstruction to the user's vision, in addition to giving the glasses a poor appearance from the aesthetic standpoint. Even if the lenses of the system are Fresnelized as suggested by Alvarez (U.S. Pat. No. 3,305,294, col. 7), he indicates conventional Fresnel lenses with abrupt changes in lens thickness, leading to undesirable obstructions to the user's vision.

A BRIEF DESCRIPTION OF THE BASIC ALVAREZ CONCEPT

FIG. 1 (prior art) shows the Alvarez (U.S. Pat. No. 3,305,294) idea of a first Alvarez lens element 40 for a variable focus lens system, with lens thickness given by $$t = k\left(xy^2 + \frac{1}{3}x^3\right) + C$$

where x and y are rectangular coordinates on a plane perpendicular to the optical axis, and k and C are constants. The lens thicknesses are exaggerated for clarity.

FIG. 2 (prior art) shows the concept of the superimposition of a first Alvarez lens element 40 and a relatively slidable second Alvarez lens element 42 made on the same principle as the first lens element, and for which the constant k has opposite sign, forming a variable focus lens system. The two lens elements combined give a dioptric (focusing) power which is constant over the field of view. When the two elements are moved relative to each other along the x axis, the focusing power of the lens system is changed.

FIG. 3 shows a section view along the x axis of the superimposed lenses of FIG. 2. The lenses are positioned for a dioptric power of zero, constant over the entire field of view.

At least one part of the edge of each Alvarez lens element has an inconvenient thickness that will lead to bulkiness and conspicuous appearance. Alvarez suggested a version of his lens employing conventional Fresnel lenses, with zone steps or boundaries which cause abrupt changes in the lens thickness. However, this expedient merely shifts the abrupt changes in thickness, along with their visual obstructions, from the lens edge towards the lens center, actually making the obstruction problem worse.

Despite the many examples of variable focus lenses and eyeglasses described in the prior art, to date none have achieved widespread commercial acceptance as an alternative to fixed focus lenses such as bifocals, trifocals, and continuously variable focus progressive lenses. A major factor in market failure of the three basic types of lens system discussed above, when mounted in spectacles, has been the bulky, complex design leading to a poor aesthetic effect. Additionally, the cost of most such lenses is considerably higher than traditional fixed focus lenses such as bifocals.

It is an object of the present invention to provide a variable focus lens system for eyeglasses.

It is another object of the invention to provide variable focus eyeglasses with minimal perceived lens obstructions and maximum clarity of view.

It is another object of the invention to provide variable focus eyeglasses that are rapidly adjustable for near and far focus.

It is another object of the invention to provide variable focus eyeglasses that are lightweight and unobtrusive, leading to a positive aesthetic effect.

It is another object of the invention to provide variable focus eyeglasses that are inexpensive enough for mass appeal.

SUMMARY

In accordance with the present invention, there is provided a variable focus lens system that can be used in eyeglasses. The lens system consists of two relatively slidable, thin lens elements superimposed on each other, arranged one behind the other along the optical axis of the lens system. The lens surfaces are substantially normal to the optical axis. To control the thickness of the lens elements, one or more of the lens surfaces of each element are divided into Fresnel zones. The zone boundary surfaces are made substantially parallel to the optical line of sight from the user's eye to the boundary, to reduce visual obstructions as perceived by the user. In an embodiment of the invention, one large Fresnel zone can be located in the central part of the lens, with the remainder of the zones near the lens periphery, to reduce visual obstructions. To reduce light scattering, an opaque coating can be applied to the zone boundaries. A finger pad can be attached to one of the lens elements to adjust the lenses' relative position for changing the focus. An optional prescription lens can be superimposed on the other lens elements, having the user's distance and astigmatism corrections.

BRIEF DESCRIPTION OF THE DRAWINGS

FIG. 7 is a rear view of an embodiment, the left-hand side of a pair of variable focus eyeglasses;

FIG. 8 is a section view of the embodiment, a frame with lenses and finger pad, taken along the plane of lines 8-8 of FIG. 7;

FIG. 9 is a section view of the embodiment, a frame with lenses, taken along the plane of lines 9-9 of FIG. 7.

DESCRIPTION OF AN EMBODIMENT OF THE PRESENT DEVICE

Figure 1:
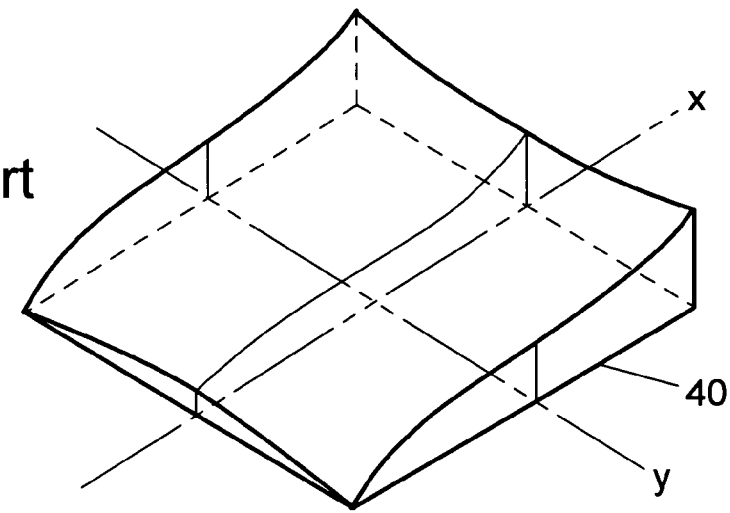
FIG. 1 (prior art) is a perspective view of a single Alvarez lens element (U.S. Pat. No. 3,305,294), the thicknesses, slopes and curvatures being exaggerated for clarity.
Figure 2:
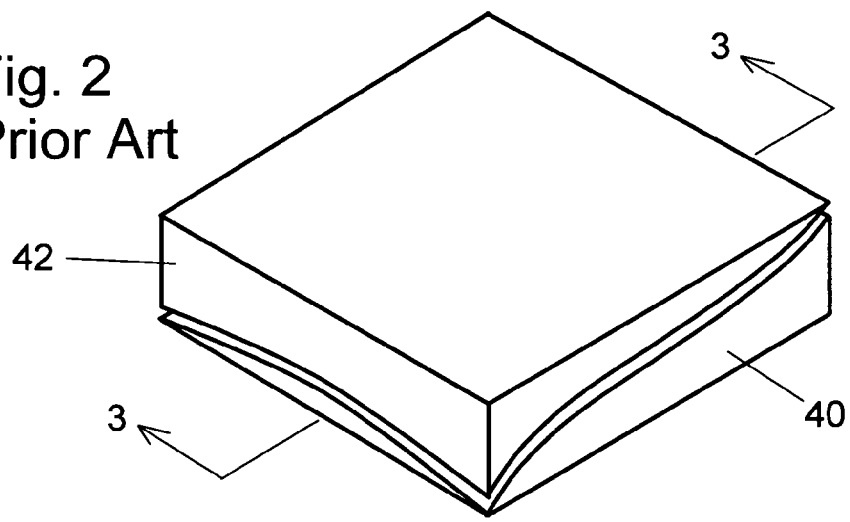
FIG. 2 (prior art) is a perspective view of two Alvarez lens elements superimposed to form a variable power lens in the zero power position, the thicknesses, slopes and curvatures being exaggerated for clarity.
Figure 3:
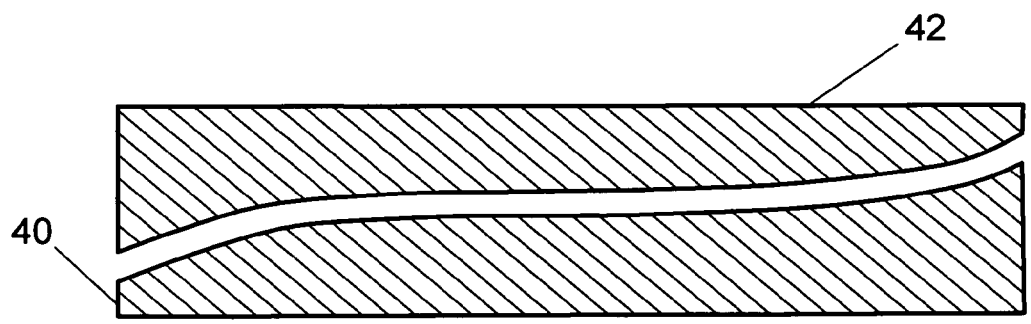
FIG. 3 (prior art) is a section view along the plane of line 3-3 of FIG. 2, two Alvarez lens elements superimposed.

The present device is a variable focus lens system that can be used in eyeglasses, which employs at least two relatively slidable lenses having Fresnel zones and sloped zone boundaries, designed to minimize perceived obstructions to the visual field and to improve the aesthetic appearance of the eyeglasses.

The present device, a variable focus lens system, the features of which are shown in FIGS. 4-9, builds upon the basic Alvarez concept by Fresnelizing it with the addition of a novel treatment of the Fresnel zone boundaries to make the zone boundaries less visible to the user and to improve the aesthetic appearance of the system when used in eyeglasses. The device may employ the feature of restricting the Fresnel zone boundaries to areas near the lens periphery, for further reducing obstructions in the visual field of view.

FIGS. 7-9 show an embodiment of the present device, a rear view of the left-hand side of a pair of eyeglasses which the user can easily focus from infinity through reading distance to close focus with the fingers, by moving a finger pad 14 along the edge of the frame 18. The prescription for astigmatism and distance correction for each eye can be changed by replacing the fixed prescription lens 16. The lenses' periphery need not be round. All the parts can be plastic (e.g. polycarbonate) with the possible exception of the earpiece holder 36 and earpieces (not shown).

The device of FIG. 7 consists of an eyeglass frame 18 with bridge 48 and earpiece holder 36, on which left and right-hand variable lens systems are mounted. In FIG. 7 only the left-hand side of the eyeglasses is shown. In the embodiment both left and right lens systems are assembled from the following: a fixed transparent first lens element 10 with one surface divided into Fresnel zones 30 and zone boundaries 28, a slidable second lens element 12 with Fresnel zones 32 and zone boundaries 33 on one surface, with attached finger pad 14, and a fixed replaceable prescription lens 16 customized with the user's astigmatism and distance corrections. The second lens element 12 slides between the fixed first lens element 10 and the fixed prescription lens 16, changing the dioptric (focusing) power of the eyeglasses through a wide range, always giving a constant power over the entire field of view of the superimposed lenses.

Figure 4:
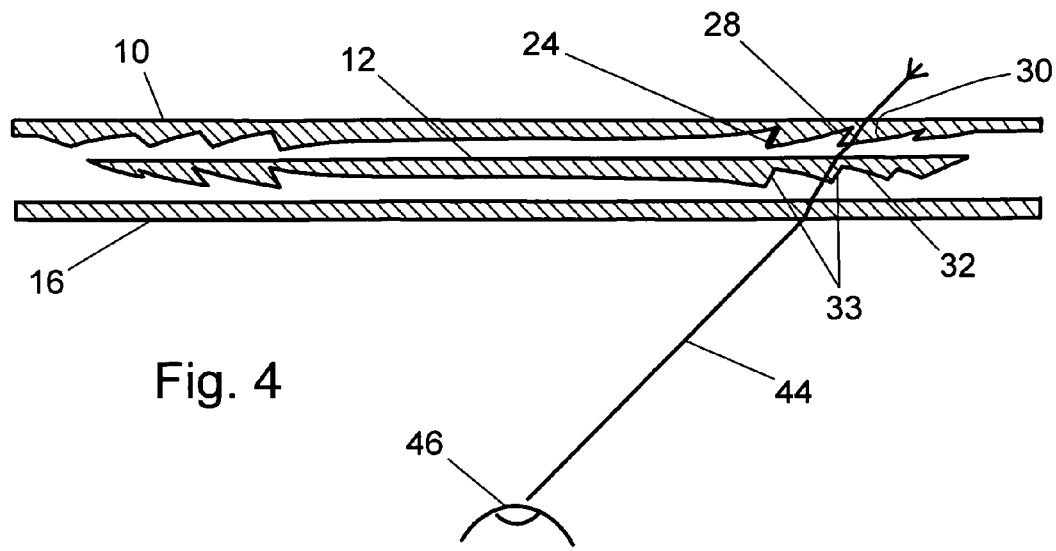
FIG. 4 is a top section view taken along the plane of line 4-4 of FIG. 6, of an embodiment of the present invention, a variable focus lens system with the first and second lens elements, and the prescription lens, in zero-power position, the thicknesses, curvatures and slopes being exaggerated for clarity.
Figure 4A:
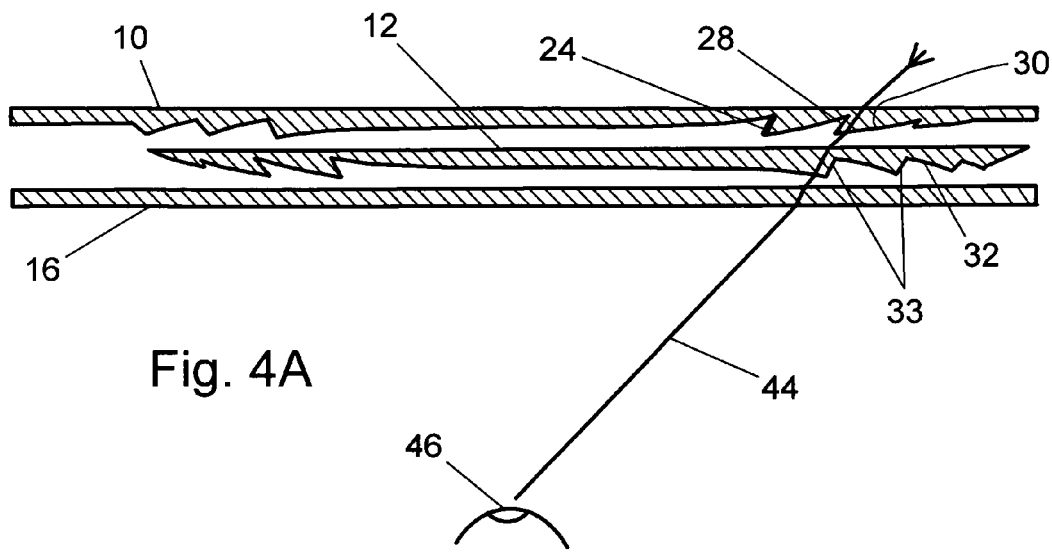
FIG. 4A is a top section view taken along the plane of line 4-4 of FIG. 6, of an embodiment with the second lens element displaced, the thicknesses, curvatures and slopes being exaggerated for clarity.

The frame 18 has a frame groove 38 for accommodating the finger pad 14, which is connected to the second lens element 12 (shown in FIGS. 6-9). The finger pad is provided with a finger pad flange 34 in such a way as to restrict the second lens movement to horizontal motion and to prevent dust from entering between the lenses. The frame groove, finger pad, frame and finger pad flange constitute a device 60 for moving one of the first and second lens elements relative to the other in a direction normal to the optical axis of the lens system. The particular configuration shown is one of many equivalent devices which will serve the same purpose. The first and second lens elements, shown in FIGS. 4, 4A, 5 and 6, are made of a strong and precision moldable material such as polycarbonate. These lenses serve as the main components of the lens system. The first lens element 10 is about 1 mm thick, and may have a slight overall curvature or "dishing out", as in conventional eyeglass lenses, for improved rigidity. Its inner (toward the user's eye) surface is divided into an array of Fresnel zones, and sloped boundaries of the zones, with a novel arrangement and treatment of the sloped boundaries of the zones. The zonal array allows control of the thickness of any particular area of the lens, regardless of the lens surface curvature or slope at that point. One or both surfaces of the first lens element 10 may have antireflection coating. In FIG. 4 and FIG. 4A, section views of the lens system for the left-hand side of a pair of eyeglasses are shown.

In the first lens element 10, px(1) and py(1) are the x and y components of the prismatic powers of each first lens zone 30.

They are given approximately by $$px(1) = kx^2 + ky^2 + D; \quad py(1) = 2kxy$$

where k is a constant and x and y are the rectangular coordinates (shown in FIG. 5), on a plane perpendicular to the optical axis, of a given point within a first lens zone 30, the zeros of x and y being located at the optical axis at the center of the first lens element 10. D is the coefficient of a prismatic power in the x direction which is constant over the entire visual field.

The x and y components of the dioptric powers are substantially the x partial derivative of the prismatic power px(1) and the y partial derivative of py(1):

$$dx(1) = 2kx; \quad dy(1) = 2kx$$

The prismatic powers px(1) and py(1) are substantially proportional to the partial derivatives with respect to x and y of the lens optical thickness at a point within any given zone. Integrating using these partial derivatives gives a thickness formula essentially identical to the Alvarez equation:

$$t(n) = k\left(xy^2 + \frac{1}{3}x^3\right) + Dx + C(n)$$

In this equation, the overall optical thickness of the nth Fresnel zone can be adjusted by a constant C(n) particular to that zone. The thickness is measured relative to a reference surface of revolution, the surface types including ellipsoidal, spherical, and planar, etc.

In this equation, the value of D is set to zero because the additional constant prismatic power implied by a nonzero D is not needed, since the fresnelization of the lens allows the thickness to be controlled for all zones.

In an embodiment of the present device, it is desired that the change in thickness from one zone to the next should be substantially constant along the zone boundary's entire length. One way of getting an equation describing the curved paths of the resulting zone boundaries is to set the thickness equal to a constant, and solve the above thickness equation for y as a function of x, C and t:

$$y = \pm\sqrt{\frac{t(n) - C(n)}{kx} - \frac{x^2}{3}}$$

By substituting various values for the numerator t(n)-C(n), one arrives at a family of curves describing the paths of the set of boundaries that result in a constant change in zone-to-zone thickness along each boundary's entire length. For example, the boundaries for a large central zone 50 having a thickness variation of 2 units, with six peripheral zones (three outer zones on each side) whose boundaries have steps in thickness of magnitude 1 unit each, would require substitutions of values proportional to the following into the above formula:

$$t(n) - C(n) = -3, -2, -1, +1, +2, +3$$

Figure 5:
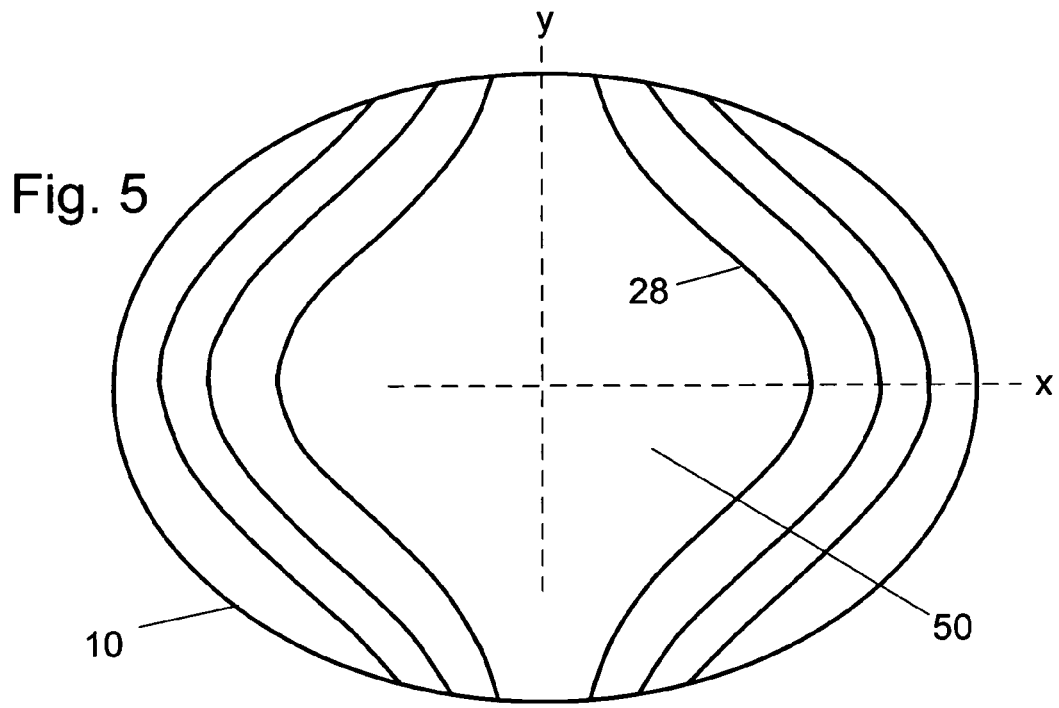
FIG. 5 is a rear view of a first lens element of an embodiment of the variable focus lens system, with curves showing the locations of zone boundaries.

A set of curves giving the locations of the resulting boundaries are shown in FIG. 5. For simplicity, the widths of the boundaries are not shown in the curves.

The above equations for thickness and prismatic and dioptric powers can be considered accurate since thin lens approximations are valid for eyeglass lenses.

In the central region of the zoned lens the values of px and py are small, therefore for maximum clarity of vision, one large central zone 50 can be made in this region. In this manner, the remaining zones can be 'crowded' onto the periphery of the lens where the lens curvatures are greater. The boundaries of these zones are less likely to obstruct the user's central vision.

A feature of the lens elements in this device, shown in FIGS. 4 and 4A, is that each first lens zone boundary 28 and second lens zone boundary 33 has a slope or slant at every point which is optimized for that point on the boundary so as to present the smallest visual obstruction to the user's eye. That is, the surface of the zone boundary is made substantially parallel to the optical line of sight 44, which is the path of a light ray extending from the perceived object, grazing the specified zone boundary as it travels through the lens, and entering the user's eye 46. This feature can be well implemented on the stationary first lens element 10, greatly reducing scattering of light into the user's eye from reflection off the boundary, and also greatly reducing perceived diffraction haloes arising from the obstructions caused by the zone boundaries themselves. In conventional Fresnel lenses in which the zone boundaries are parallel to the optical axis, the resulting obstructions at substantially regular, closely spaced intervals may cause a severe case of diffraction haloes perceived near bright objects. In the present device, the substantial reduction of this effect allows the use of zone boundaries which are much smaller and closer together, making them less noticeable in their effects.

In addition, light scattering from refraction and reflection at the boundary surfaces can be further reduced by applying a thin layer of opaque light-absorbing coating 24 to the boundary itself. In FIGS. 4 and 4A is shown one boundary with the opaque coating 24 applied.

In FIG. 4 and FIG. 4A, a slidable second lens element 12 is shown, with zones and boundaries on the rear surface, the lens having a substantially uniform thickness, and tapering to zero thickness at the edge. The second lens element 12 has an attached finger pad 14 and is made of a precision moldable material such as polycarbonate. Its width and height are about 80% to 90% of those of the first lens, to allow a horizontal range of motion of about 4 mm. Its thickness ranges from zero at the edge to 0.2 mm to 0.5 mm near the center. The edge is made thin and sharp to reduce visual obstruction and to improve the aesthetics of the lens. The ability to make the edge sharp is an additional advantage of employing the Fresnel concept with sloped boundaries for the second lens. One or both surfaces of the second lens element 12 may have antireflection coating applied.

In the embodiment, only one surface of the second lens element has a zonal array, since it is not desirable for zoned surfaces of the first and second lenses to have the possibility of coming into contact. The second lens element 12 is about 0.2 mm to 0.6 mm, from the first lens element 10. The array of zones and zone boundaries is similar to those of the first lens, except for the opposite sign of k in the thickness and power formulas. The zonal array allows control of the lens thickness for any zone of the lens, regardless of the curvature or slope at that zone and other points, employing the basic principle of the Fresnel lens. As with the first lens element 10, one large central zone can be made on the second lens element 12.

When the second lens element 12 is superimposed against the first lens element 10 with the zones of the two lenses properly aligned in the zero displacement position, the prismatic powers, and thus the dioptric power, of the two lenses cancel to zero, causing the system to focus on infinity. When the second lens element 12 is displaced horizontally along the x axis (of the first lens element 10) a distance h by moving the finger pad 14, as shown in FIG. 4A, a different combination of powers of the two lenses come into alignment. This produces a different dioptric power, constant over the entire view area of the superimposed lenses. The prismatic and dioptric powers of the second lens element 12 are the opposite sign of those of the first lens element 10.

$px(2)$ and $py(2)$ are the x and y components of the prismatic powers of each second lens zone 32. In the h=0 position they are given substantially by $$px(2) = -kx^2 - ky^2 + E; \quad py(2) = -2kxy$$

E is the coefficient of a prismatic power in the x direction which is constant over the entire visual field. The x and y components of prismatic powers of each second lens zone 32 when the second lens 12 is displaced by a length h, are given by $$px(2) = -k(x-h)^2 - ky^2 + E; \quad py(2) = -2k(x-h)y$$

where the zeros of x and y are at the optical axis of the stationary first lens element 10.

The x and y components of the dioptric powers of the non-displaced second lens are:

$$dx(2) = -2kx; \quad dy(2) = -2kx$$

The dioptric powers for the displaced second lens 12 are therefore:

$$dx(2) = -2k(x-h); \quad dy(2) = -2k(x-h)$$

When the second lens element 12 is moved by h units horizontally (along the x axis) relative to the first lens element 10, the total dioptric power of the superimposed first and second lenses is:

$$dx(\text{total}) = dx(1) + dx(2) = 2kh$$
$$dy(\text{total}) = dy(1) + dy(2) = 2kh$$

The dioptric power of the superimposed first and second lenses is thus constant over the entire viewing area, and the superimposed lenses have zero astigmatism.

The total prismatic powers of each superimposed pair of lenses, with D and E set to zero, are:

$$px(\text{total}) = px(1) + px(2) = kx^2 - k(x+h)^2 = -2kxh - kh^2$$
$$py(\text{total}) = py(1) + py(2) = 2kxy - 2k(x+h)y = -2kyh$$

The second term of px(total) is a constant over the entire lens that is dependent only on the position of the second lens element 12. It is independent of x and y, and is equivalent to an h-dependent prism which is constant over the visual field. This is actually beneficial, since to some extent it can help to correct the system for parallax of vision for the left and right eyes. For both left and right hand lens systems of the eyeglasses, the sign of the constant k and of the displacement h can be chosen so as to give a parallax convergence of vision for both eyes toward the perceived object when the dioptric power is adjusted for close focus.

As was implemented in the first lens element 10, the zone steps or boundaries of the second lens element 12 are given a slope or slant which is optimized for each boundary so as to present the smallest optical cross-sectional obstruction to the user's vision. The surface of the second lens zone boundary 33 is made substantially parallel to the optical line of sight 44, which is the path of a light ray extending from the user's eye pupil to the specified second lens zone boundary 33, through the lens to the perceived object. For the slidable second lens element 12, the zone boundary slope or slant is predetermined so as to minimize the perceived cross-sectional obstruction, when averaged over the range of motion of the lens.

In addition, any light scattering from refraction and reflection from the boundary surface can be further reduced by applying an opaque coating 24 of light-absorbing material to the surfaces of the zone boundaries.

Figure 6:
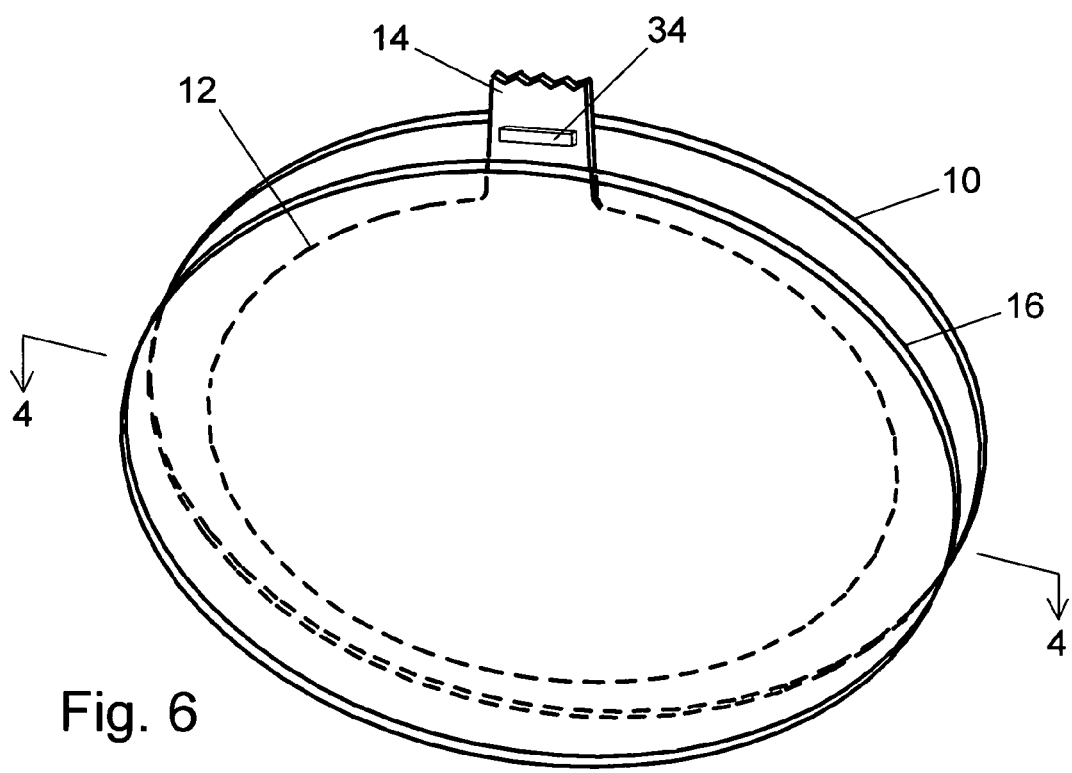
FIG. 6 is a perspective view of an embodiment of the variable focus lens system, the lens spacings being exaggerated for clarity.

A transparent prescription lens 16, with or without Fresnel zones and boundaries, is superimposed on the first and second lens elements, as shown in FIG. 6. It can be attached to, or snapped onto, the frame 18. The prescription lens 16 can be customized to provide the wearer's distance and astigmatism correction. It is mounted either behind or in front of the first and second lens combination, the slidable second lens element 12 being located between the first lens element 10 and the prescription lens 16. If the prescription lens 16 has Fresnel zones (possibly desirable if the required prescription power is large), the zones and their boundaries can be made according to the same principles as are employed in the first lens element 10. The prescription lens 16 has the second function of protecting the surfaces of the first and second lens elements from dust, scratches and impacts. Either or both surfaces of the prescription lens 16 can have antireflection coating applied. The prescription lens may be tinted, or have variable light absorption which is dependent on the ambient illumination, such as that employed in the photochromic lenses.

In FIG. 7 are shown the arrangement of the superimposed first 10 and second lens elements 12, and transparent prescription lens 16, with the finger pad 14, frame groove 38, and finger pad flange 34 for moving the second lens element. The spacings between lenses are exaggerated for clarity. In FIG. 8 is shown a section view of the frame 18 with attached first lens element 10 and prescription lens 16. The second lens element 12 is supported in the frame groove 38, and its motion is thereby restricted to horizontal movement In FIG. 9 is shown a section view of the frame 18 with attached first lens element 10 and prescription lens 16. Also shown is an edge of the second lens element 12.

The fixed lenses can be about 1 mm thick; the slidable second lens element 12 can be made thinner, about 0.1 mm to 0.5 mm. All three lenses can have an overall curvature or "dishing out" similar to that of conventional eyeglass lenses, for improved rigidity. This is accomplished for a given lens by giving one side of the lens a concave bias and the other side a convex bias. In this way the thickness and power equations are left unaffected.

The focus adjusting finger pad 14 is attached to, or molded as an integral part of, the second (slidable) lens. The finger pad 14 protrudes unobtrusively through a slot in the frame 18. The finger pad 14 enables the user to rapidly and easily move the slidable second lens element 12 with a finger to adjust the focus of the lens system. Each of the left and right-hand lens systems of the eyeglasses can be independently focused, having its own adjustment pad. There can be an optional link (not shown) across the bridge 48, such as a rod attached between the two finger pads, for simultaneous coordinated focus control. If it is desired that the motion of the finger pad 14 should closely follow the curved contour of the frame 18, then the finger pad can be split into two portions (not shown), the top portion of the finger pad functioning as a detached rider controlling the lower portion's motion.

Since some of the zone boundaries overlap adjacent areas of the Fresnelized lenses when viewed from a direction along the optical axis, the molding process used in their manufacture should include the precaution of separating the molding die from the molded lens at an oblique angle to prevent damage to the overlapping zone boundaries.

To sum up the advantages of the present device: Primarily, the device leads to less thickness of the lenses than previous versions of the slidable lens concept. It also leads to less obstruction to the user's view than slidable lens concepts involving conventional types of Fresnel lenses having abrupt changes in lens thickness. A wide range of adjustable power, of about 4 to 5 diopters, is available with the present device, and the power is manually adjustable with great rapidity, on the order of 1 second. To the wearer the lenses will not appear obstructed or "dirty", as would occur with conventional Fresnel lenses with zone boundaries parallel to the optical axis. Since the optical obstruction produced by zone boundaries is reduced, the related diffraction effects are greatly diminished, making possible lenses with a large number of zones near the lens edges, each zone boundary being much smaller and less noticeable. The present device is lighter (approximately 30 grams or less), comfortable for extended wear, substantially less complex, thinner and less obtrusive than previous designs, thus is preferred on aesthetic grounds. It is also less costly, since the lens elements can be molded by mass production by a process similar to that used for making compact discs. For the wearer's safety the device can be made of shatterproof materials such as polycarbonate.

The device is not limited to the embodiment herein set forth. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

The invention claimed is:

1. A variable focus lens system for use in eyeglasses, comprising:
   (a) a first lens element, for simulating an alvarez lens element, one surface of said first lens element being divided into a plurality of transparent fresnel zones and at least one zone boundary of said transparent fresnel zones, each of said transparent fresnel zones having prismatic powers, in the x and y directions, substantially equal to $px(1)=kx^2+ky^2+D; py(1)=2kxy$ wherein x and y are rectangular coordinates on a plane perpendicular to the optical axis of the lens system, centered on the optical axis, k is a constant representing the rate of variation of lens dioptric power in the x direction, and D is a constant representing the coefficient of a prismatic power which is constant over the field of view;
   (b) a second lens element, for simulating an alvarez lens element, superimposed in tandem on said first lens element along the optical axis of the system, said second lens element being relatively slidable in a direction normal to the optical axis of the lens system, one surface of said second lens element being divided into a plurality of transparent fresnel zones and at least one zone boundary of the fresnel zones of the second lens element, each of the fresnel zones of the second lens element having prismatic powers, in the x and y directions, substantially equal to $px(2)=-kx^2-ky^2+E; py(2)=-2kxy$ where E is a constant representing the coefficient of a prismatic power which is constant over the field of view;

each zone boundary of the first and second lens elements having a predetermined slope at every point thereof, said slope having a value which substantially minimizes a visual obstruction caused by the zone boundary at said point as seen from a predetermined reference point on the optical axis on the eyeball side of the lens system representing the pupil of the user's eye;
   the second lens element having an edge which is tapered, the thickness of the second lens element at said edge being substantially zero, for aesthetic purpose;
   the second lens element having a maximum width, in the x direction, which is less than the maximum width, in the x direction, of the first lens element;
   (c) a transparent prescription lens, for providing user's distance and astigmatism correction, and for protecting the first and second lens elements from dust and impacts, the prescription lens being superimposed on said first and second lens elements, the second lens element being medial the first lens element and the prescription lens;
   (d) the first and second lens elements and the prescription lens having antireflection coating;
   (e) said one surface of said first lens element, having a plurality of transparent fresnel zones and at least one zone boundary, being adjacent the second lens element;
   (f) said one surface of said second lens element, having a plurality of transparent fresnel zones and at least one zone boundary, being adjacent the prescription lens;
   (g) means for moving said second lens element relative to said first lens element in a direction normal to the optical axis of the lens system, said means comprising a finger pad attached to said second lens element; and
   (h) a light absorbing coating, applied to the at least one zone boundary of the first and second lens elements, for reducing light scattering from the at least one zone boundary.

2. The variable focus lens system as recited in claim 1, wherein the path of each zone boundary follows a curve substantially given by the function $$y = \pm\sqrt{\frac{t(n)-C(n)}{kx} - \frac{x^2}{3}}$$

wherein the value of t(n)−C(n) is a predetermined constant particular to each zone boundary, whereby the thickness step size caused by the zone boundary is substantially equalized along its entire length.

3. The variable focus lens system as recited in claim 1, wherein one of said transparent fresnel zones in each of the first and second lens elements occupies at least all of the surface of the lens element within a distance from the optical axis equal to one fourth of the minimum radius of the lens element, measured from the optical axis of the lens element, whereby obstruction in the central visual field is reduced.

4. The variable focus lens system as recited in claim 2, wherein one of said transparent fresnel zones in each of the first and second lens elements occupies at least all of the surface of the lens element within a distance from the optical axis equal to one fourth of the minimum radius of the lens element, measured from the optical axis of the lens element, whereby obstruction in the central visual field is reduced.

* * * * *